US006880930B1

United States Patent
Henderson

(10) Patent No.: US 6,880,930 B1
(45) Date of Patent: Apr. 19, 2005

(54) EYEGLASS HOLDER

(75) Inventor: Billy D. Henderson, Crawfordsville, IN (US)

(73) Assignee: Bill Henderson, Crawfordsville, IN (US)

(*) Notice: Subject to any disclaimer, the term of this patent is extended or adjusted under 35 U.S.C. 154(b) by 0 days.

(21) Appl. No.: 10/842,530

(22) Filed: May 11, 2004

(51) Int. Cl.[7] .................................................. G02C 1/00
(52) U.S. Cl. ........................ 351/158; 24/3.3; 248/309.1
(58) Field of Search ............................ 351/158; 24/3.1, 24/3.3; 248/309.1, 311.2, 311.3

(56) References Cited

U.S. PATENT DOCUMENTS 4,830,480 A * 5/1989 Ennis ........................ 351/158
5,078,484 A * 1/1992 Vaughn ....................... 351/51

* cited by examiner

Primary Examiner—Huy Mai
(74) Attorney, Agent, or Firm—Bill Henderson

(57) ABSTRACT

An eyeglass holder formed to include two similar expanded C shaped hooks at the front lower end of said holder and from the back lower end having two vertical legs of the same piece at the top of said holder forming a radius pivot point. The Top being less width than the bottom hooks which form a cradle allowing the eyewear to be supported by the holder while the top of the holder would be placed on a supporting article such as the post of an automobile rearview mirror or other suitable means.

5 Claims, 3 Drawing Sheets

EYEGLASS HOLDER

CROSS-REFERENCE to RELATED APPLICATIONS

Not Applicable

STATEMENT REGARDING FEDERALLY SPONSORED RESEARCH OR DEVEOPMENT

Not Applicable

REFERENCE TO SEQUENCE LISTING, A TABLE, OR A COMPUTER PROGRAM LISTING COMPACT DISK

Not Applicable

BACKGROUND OF THE INVENTION

The invention is a prescription or non-prescription eyeglass holder used to support eyewear on an automobile rearview mirror or any other suitable point for hanging the invention where eyeglass storage is needed.

The need for a safe, convenient and easily obtainable storage for eyewear in an automobile is the primary intent of the invention. The simplicity and style of this eyeglass holder is also satisfies a growing desire Personalize ones vehicle as the invention is easily initialized.

Other examples of patented eyewear holders such as, U.S. Pat. No. 5,568,872; Hinnant, Sr, U.S. Pat. No. 4,157,166; Voelker, U.S. Pat. No. 3,552,701; Montagno, would not perform as well under the aforementioned criteria.

BREIF SUMMARY OF THE INVENTION

This eyeglass holder is simply placed onto almost all automobile rear view mirrors with no tools, or directions. The invention has no moving parts and will hold four pair of eyewear which also has a stabilizing effect on the unit. There is no need to fold the eyewear to place on the holder once it is on the rearview mirror and no need to unfold to place back in wearing position. There are no holes or straps to try to hit or thread through, you simply place your eyewear on the holder. The construction is a one piece metal or plastic form that is simple to make, install and use.

The object of this invention is to provide the user with a high quality, affordable way to store eyewear on an automobile rearview mirror or other suitable platform, with the earpiece sections in the open position.

BREIF DESCRIPTION OF SEVERAL VIEWS OF THE DRAWING

FIG. 7 is also a perspective view of the eyeglasses on present invention.

DETAILED DESCRIPTION OF THE INVENTION

Figure 1:
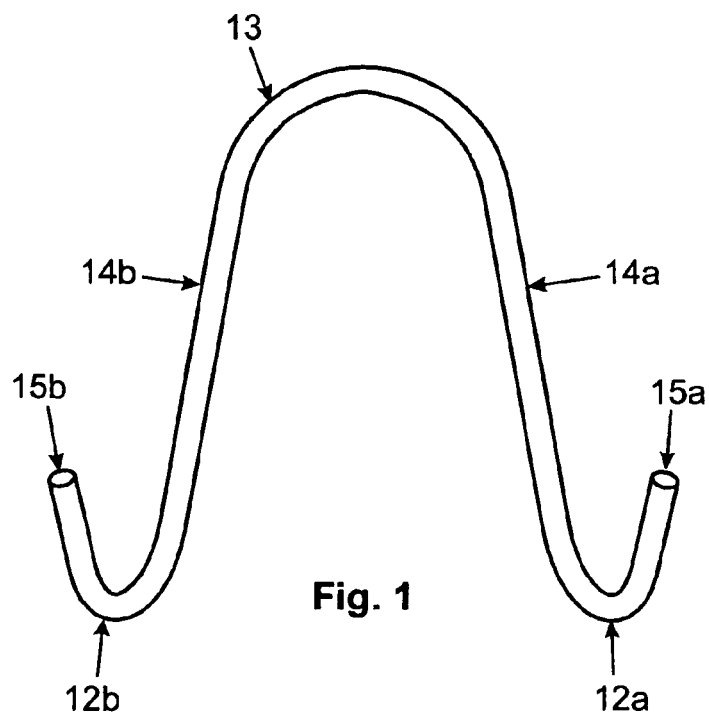
FIG. 1 is a front view of the eyeglass holder in accordance with the present invention.
Figure 2:
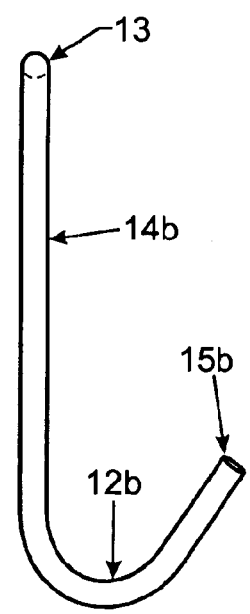
FIG. 2 is a side view of the eyeglass holder.
Figure 3:
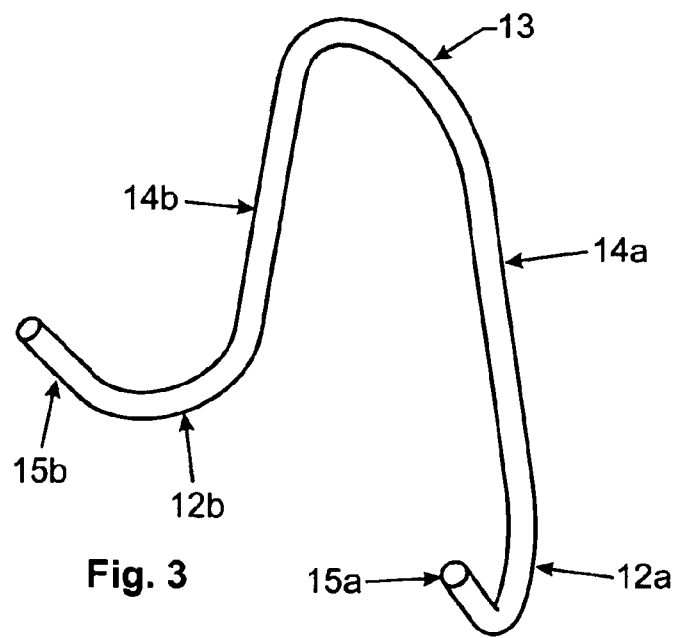
FIG. 3 is an alternative perspective of the eyeglass holder.

In reference to the present invention, FIGS. 1 through 3 represent a single piece of metal or plastic substrate, solid or hollow in structure and formed to a shape which accomplishes the effect necessary to transform the material into an eyeglass holder. The shape or diameter of the wall structure can vary and is not critical to the function of the invention.

Present invention will be placed on the fixed post 21 of an automobile rearview mirror just behind the mirror. The bottom hooks FIG. 1 12a and 12b facing the user so the eyewear can be placed with temples open and facing away from user on the outside of legs 14a and 14b., until eyewear rests on hook bottoms 12a and 12b.

Multiple pairs of eyewear can be stored until limits 15a and 15b are reached. Present invention utilizes the fulcrum point 13 to provide a balance point for the holder and eyewear has a stabilizing effect on the balance of the unit while vehicle is in motion. Whereas the distance between the bottom of hooks 12a and 12b being an equal distance to fulcrum point 13 and termination points 15a and 15b being of equal length and diameter.

Figure 4:
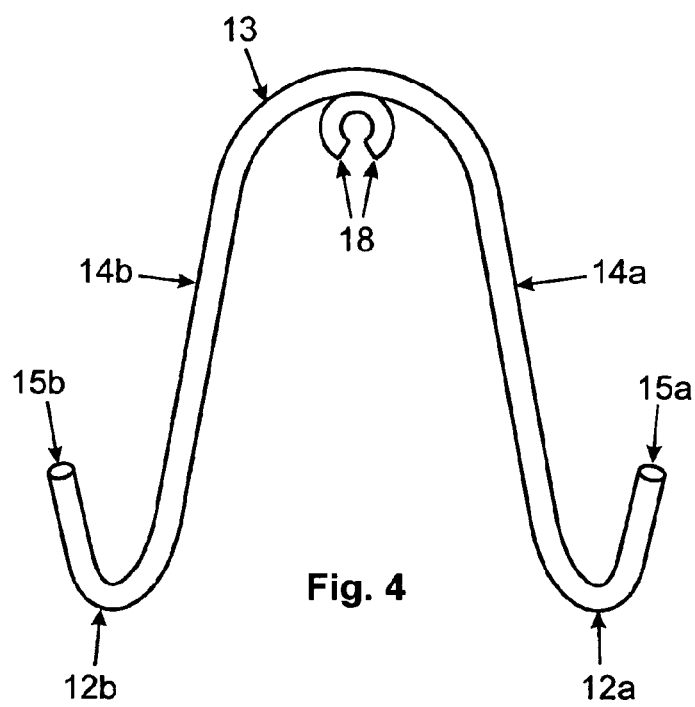
FIG. 4 is a front view of the eyeglass holder with optional mounting clamp.
Figure 5:
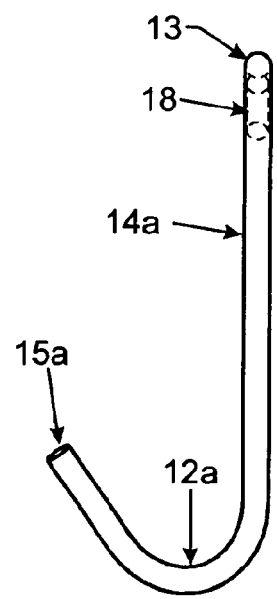
FIG. 5 is a side view of the eyeglass holder with optional clamp.
Figure 6:
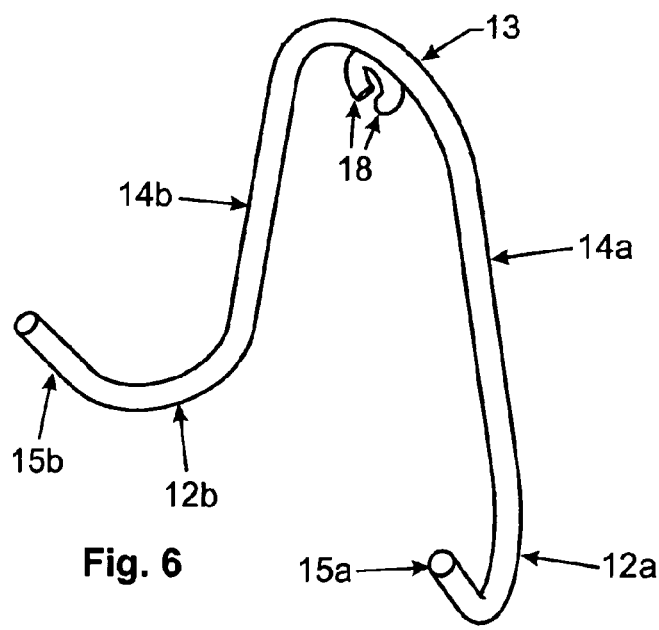
FIG. 6 is an alternative perspective of the eyeglass holder with optional clamp.

FIG. 4 is a front view of present invention with the addition of an optional clamp 18, for solid or semi-solid to the rearview mirror post of other suitable mounting device. FIG. 5 is a side view of the same clamping modification 18, and FIG. 6 is a perspective view of clamping modification 18. Clamping modification 18 shown is a semi rigid plastic designed to be flexible enough to hold to post 21 or other suitable mounting device, but can be of any clamping design. Clamp 18 and FIGS. 4,5 &6 represent a plastic molded representation of the present invention.

Figure 7:
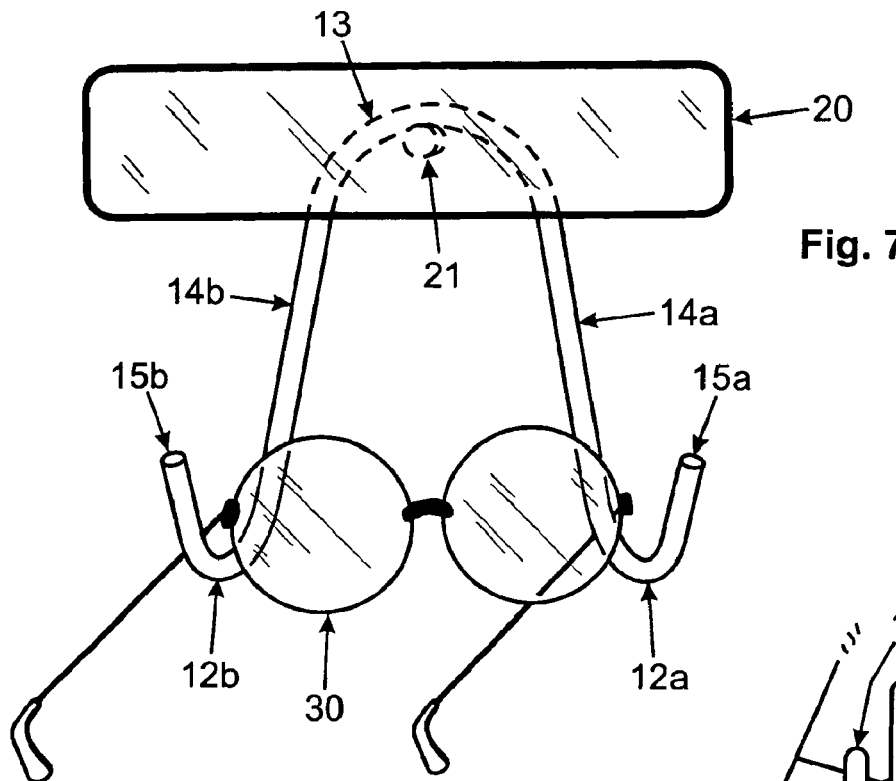
FIG. 7 is a view of the present invention without the optional clamp, supported by the fixed post of an automobile rear view mirror.

FIG. 7 depicts the front view of a automobile rearview mirror 20, with holder resting on the fixed post 21 of the mirror. The eyewear 30 has been placed bottom hooks 12a and 12b, with temple pieces being on the outside of legs 14a and 14b. The weight of the temples will cause the eyewear to reach a balance point in the hooks 12b and 12a, which will stabilize the eyewear on the holder.

Figure 8:
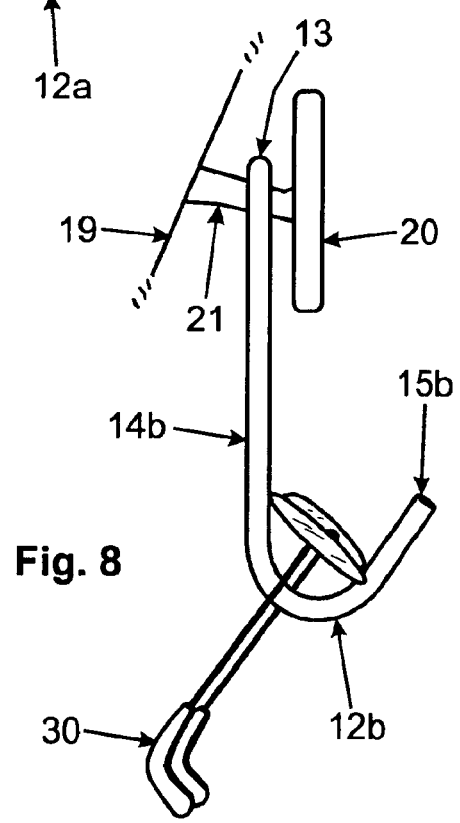
FIG. 8 is a side view of FIG. 7 with the present invention supporting a pair of eyewear while being supported by the post of an automobile rearview mirror.

FIG. 8 shows the present invention with a side view. The rearview mirror post 21 is attached to the windshield 19.

The radius of leg bends on 14a and 14b are determined by applications and may vary.

The radius on bottom hooks 12a and 12b are determined by application and may vary.

The length between points 12a and 12b to fulcrum point 13 may vary according to application but will remain equal to establish the balance point.

The length between points 12a and 12b will be less than the distance between an average pair of eyeglass temples, and transition in distance to the fulcrum at point 13.

The present invention can be manufactured from a single strand of flexible wire FIG. 1 on a three axis metal bender very efficiently. A roll of wire or other shaped substrate suitable for forming but with enough tensile strength to hold its shape and 1–3 pair of eyewear will be very easy to manufacture where labor is a strong determining factor for product price point.

Present invention can also be molded mechanically or free form using thermoplastic molding techniques or thermo-set plastics or other substrates. A multi cavity molding tool and press would be the most advantageous mode of manufacture.

The primary markets would be retail point of purchase and the ad specialty markets. The present invention will be well suited for initialization or advertising in manufacture or post manufacture. As it is a single piece manufacture with no moving parts, as do inventions referred to in U.S. Pat. No. 4,157,166 which hold eyewear in a folded position but has complications in manufacture and mounting to a rearview mirror. Another holder under U.S. Pat. No. 5,568,872 Hinnant, also holds eyewear in the folded position and would be more difficult to manufacture and mount on rearview mirror. Yet another holder under U.S. Pat. No. 5,842,613, White, uses the folded Position utilizes several pieces and would be more difficult to manufacture.

The present invention is ultimately more universal to adapt to any automobile rearview mirror, has the advantage to be manufactured in more ways in a variety of substrates, with better economics of scale. Function is even improved by the ability to place eyewear on the holder without folding and retrieving from holder with one hand by the nosepiece and inserting on face for use.

What I claim as my invention is:

1. An eyeglasses holder designed to support eyewear whereas holder is a single piece wire formed to become a double hook hanger whereas each hook is an expanded C hook shape with its termination being at front of said hanger at a point determined by application and the back of said hook which transitions vertically in equally decreasing distances therebetween to a height determined by application of said holder and a width determined by the distance between the temple arms of said eyewear which would consist of two lens sockets a nosepiece and two temple arms which would be positioned on said eyeglasses holder by placing the temple arms over the said holder until the lens sockets are in the circumference of the expanded C shaped hooks of the eyeglasses holder whereas the said holder would be supported at the top elevation pivot point on any supporting article.

2. The eyeglasses holder of claim 1, wherein the single wire form could be of various diameter and shape and wherein the material composition would be determined by application and with respect to certain functionality requirements.

3. An eyeglasses holder designed to support eyewear whereas holder is a molded substrate in the shape of a double hook hanger whereas each hook is an expanded C hook shape with its termination being at the front of said hanger at a point determined by application and the back of said hook which transitions vertically in equally decreasing distances therebetween to a height determined by application of said holder and a width determined by the distance between the temple arms of said eyewear which would consist of two lens sockets a nosepiece and two temple arms which would be positioned on said eyeglasses holder by placing the temple arms over the said holder until the lens sockets are in the circumference of the expanded C shaped hooks of the eyeglasses holder whereas the holder would be supported at the top elevation pivot point on any supporting article.

4. The eyeglasses holder of claim 3, Wherein an attachment clamp could be added to the said holder at the top or bottom of the top elevation pivot point in the forming process or added post manufacture.

5. The eyeglasses holder of claim 3, Wherein the said holder structure could be of varying diameter and shape constructed of materials of varying substrates determined by application or manufacturing process.

* * * * *